United States Patent
Buss

(10) Patent No.: US 12,281,742 B2
(45) Date of Patent: *Apr. 22, 2025

(54) LINING TUBE FOR RESTORING DEFECTIVE SEWER SHAFTS INCLUDING A BERM AND A CHANNEL, AND METHOD FOR PRODUCING SAME, AND METHOD FOR LINING A DEFECTIVE SEWER SHAFT

(71) Applicant: Brandenburger Liner GmbH & Co. KG, Landau (DE)

(72) Inventor: Johannes Buss, Hohberg (DE)

(73) Assignee: Brandenburger Liner GmbH & Co. KG, Landau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/717,013

(22) PCT Filed: Nov. 22, 2022

(86) PCT No.: PCT/EP2022/082847
§ 371 (c)(1),
(2) Date: Jun. 6, 2024

(87) PCT Pub. No.: WO2023/110332
PCT Pub. Date: Jun. 22, 2023

(65) Prior Publication Data
US 2025/0035247 A1  Jan. 30, 2025

(30) Foreign Application Priority Data

Dec. 13, 2021 (DE) .................... 10 2021 006 141.1

(51) Int. Cl.
*E03F 5/02* (2006.01)
*E02D 29/12* (2006.01)
(Continued)

(52) U.S. Cl.
CPC ........ *F16L 55/1654* (2013.01); *E02D 29/128* (2013.01); *E03F 2003/065* (2013.01)

(58) Field of Classification Search
CPC ... F16L 55/1654; F16L 55/163; F16L 55/165; F16L 55/1656; E02D 29/128; E03F 2003/065
See application file for complete search history.

(56) References Cited

U.S. PATENT DOCUMENTS 5,106,440 A  4/1992 Tangeman
5,798,013 A  8/1998 Brandemburger
(Continued)

FOREIGN PATENT DOCUMENTS

DE 102011103001 A1 11/2012
EP 2857188 A1 4/2015
(Continued)

*Primary Examiner* — Benjamin F Fiorello
(74) *Attorney, Agent, or Firm* — Laurence A. Greenberg; Werner H. Stemer; Ralph E. Locher

(57) ABSTRACT

A lining tube for restoring a defective sewer shaft has an inner film tube and a radially expandable tubular layer of fiber material impregnated with a curable reaction resin. The inner film tube has a connecting portion that connects two circumferential portions, to a circumferentially closed inner film tube with a defined nominal diameter. The connecting portion has a predetermined breaking point that can be separated in the circumferential direction by introducing a pressure medium into the inner film tube in order to radially expand the inner film tube and the layer of fibrous material beyond the nominal diameter. The tubular layer of fiber material is closed by a seam at a first end that can be introduced into a channel of the sewer shaft. The seam extends orthogonally to the longitudinal axis of the tubular layer of fiber material of the lining tube.

21 Claims, 10 Drawing Sheets

(51) Int. Cl.
*F16L 55/165* (2006.01)
*E03F 3/06* (2006.01)

(56) References Cited

U.S. PATENT DOCUMENTS

| | | | |
|---|---|---|---|
| 6,296,729 B1 * | 10/2001 | Kamiyama | B29C 65/4815 156/218 |
| 6,540,439 B2 * | 4/2003 | De Bruijn | F16L 55/1654 405/184.2 |
| 6,612,340 B1 * | 9/2003 | Lause | F16L 55/1656 138/97 |
| 6,932,116 B2 * | 8/2005 | Smith | F16L 55/1656 264/269 |
| 8,821,068 B2 * | 9/2014 | Kiest, Jr. | E02D 29/12 264/269 |
| 9,334,998 B2 | 5/2016 | Duttenhoefer | |
| 9,709,206 B2 | 7/2017 | Duttenhoefer et al. | |
| 10,202,736 B1 * | 2/2019 | Plummer | B32B 5/022 |
| 11,708,930 B2 * | 7/2023 | Smit | E02D 29/128 138/98 |
| 2006/0151042 A1 * | 7/2006 | Stringfellow | F16L 55/1656 138/125 |
| 2010/0012214 A1 * | 1/2010 | Kamiyama | F16L 55/1656 405/184.2 |
| 2015/0023735 A1 | 1/2015 | Eschenbrenner et al. | |
| 2016/0305579 A1 * | 10/2016 | Graham | B32B 5/26 |
| 2018/0003331 A1 * | 1/2018 | Morissette | B32B 27/40 |
| 2019/0193324 A1 * | 6/2019 | Sugahara | B29C 63/0004 |
| 2019/0338880 A1 * | 11/2019 | Beltran | F16L 55/1656 |
| 2019/0360628 A1 * | 11/2019 | Corneil | F16L 11/12 |
| 2024/0117587 A1 * | 4/2024 | Blenke | E02D 29/128 |
| 2024/0117620 A1 * | 4/2024 | Blenke | F16L 55/1654 |

FOREIGN PATENT DOCUMENTS

| | | |
|---|---|---|
| WO | 9504646 A1 | 2/1995 |
| WO | 2013139892 A2 | 9/2013 |

\* cited by examiner

LINING TUBE FOR RESTORING DEFECTIVE SEWER SHAFTS INCLUDING A BERM AND A CHANNEL, AND METHOD FOR PRODUCING SAME, AND METHOD FOR LINING A DEFECTIVE SEWER SHAFT

FIELD AND BACKGROUND OF THE INVENTION

The invention relates to a lining tube for restoring defective sewer shafts including a berm and a channel and a method for producing the same and for lining a defective sewer shaft.

In the sector of trenchless restoration of defective pipelines, such as, for example, defective waste water channels, lining tubes which have one or more layers comprising a glass fiber laminate which is impregnated with a liquid reaction resin and which is arranged in the form of fiber tapes which are wound or placed in an overlapping manner around an inner film tube are increasingly used. At the outer side, the laminate is surrounded by an outer film tube which prevents a discharge of harmful substances, in particular styrene, from the reaction resin into the soil. The lining tubes which are also referred to as inliners are pulled into a sewer which is intended to be restored, after being pulled in are closed at the ends thereof using packers and expanded by means of compressed air and cured by means of light from a UV source, or alternatively by introducing hot vapor.

A previously mentioned lining tube and a method for producing the same are known, for example, from WO-A 95/04646.

Sewer shafts must be restored in the same manner as pipelines. It is advantageous to use the same methods for this. However, sewer shafts, in comparison with pipelines, such as waste water pipes, have the specific feature that they extend vertically and are not constant in terms of their diameter. Sewer shafts or generally shaft constructions generally have a shorter upper portion which extends from the upper shaft opening downward in a vertical direction, an adjacent conical transition portion and a longer lower generally cylindrical portion which adjoins the conical transition portion and which has a large diameter which extends down as far as the base of the shaft. The lower cylindrical shaft portion has, for example, a diameter of 1000 mm, which tapers over the conical transition portion to a diameter of, for example, 600 mm in the region of the upper opening. Since sewer shafts or generally shaft constructions are not subject to any standards, there are a large number of different embodiments which differ in terms of the length, diameter and conical shape thereof.

For the restoration of sewer shafts, the same technique which is also used in the restoration of previously described pipelines and channels has been used for some time. Although the perpendicular orientation of the sewer shafts is less problematic for the use of a previously described lining tube for pipelines, during installation the problem arises that the diameter jump between the upper and the lower sewer portion is very large and cannot be covered by conventional liners which enable a maximum expansion of up to 10% of the basic diameter without there being the risk of the sensitive inner film tube and also the winding of the glass fiber strip overexpanding and thereby becoming damaged.

From WO 2013/139892 A1 it is known in this context to wind lining tubes for restoring sewer shafts on a winding mandrel with an endless length which is a positive form of the shaft construction with a conical transition portion. Although the lining tubes produced in this manner enable a restoration of sewer shafts with comparatively large diameter jumps of more than 50%, they have the shortcoming that an individual winding mandrel has to be produced for each embodiment, which increases the production costs significantly.

Although it is possible with such a lining tube for sewer shafts to restore both cylindrical portions and the conical portion of a sewer shaft, for complete restoration of a sewer shaft it is generally also necessary to line the so-called berm and also the channel of the sewer shaft. This is generally carried out manually in additional working steps, for example, using molded components or liquid coatings, which is very labor-intensive and leads to correspondingly high costs.

SUMMARY OF THE INVENTION

Accordingly, an object of the present invention is to provide a lining tube which enables sewer shafts with different inner diameters in each case including the berm and the channel to be restored with one and the same lining tube.

This object is achieved according to the invention with a lining tube having the features as claimed.

Another object of the invention is to provide a method by means of which such a lining tube can be produced.

This object is achieved according to the invention with a method having the features as claimed.

Yet another object of the invention is to provide a method by means of which such a lining tube can be installed in a defective sewer shaft.

This object is achieved according to the invention with a method having the features as claimed.

Other features of the invention are described in the dependent claims.

According to the notion on which the invention is based, a cylindrical lining tube which is circular in cross section is configured in such a manner that it can adapt when expanding to the different diameters of a sewer shaft. This enables the lining tube, as described in WO-A 95/04646 to be produced as an endless tube so that it can be divided by the user on site at the construction location into a plurality of individual part-tubes which each have a length which corresponds to the depth of the sewer shaft which is intended to be restored.

The lining tube comprises to this end in a similar manner to a lining tube for restoring conventional horizontally extending sewers and pipelines an inner film tube on which at least one layer of a helically wound or alternatively also circumferentially positioned fiber tape, in particular of a glass fiber tape or glass fiber nonwoven material which is impregnated with a liquid reaction resin which can be cured by means of UV light is arranged. This is preferably followed by a glass fiber tape (longitudinal drawstring) which is orientated in the longitudinal direction which discharges the tensile forces when the lining tube which is also referred to below as a "liner" is installed in a sewer shaft.

Around the layer which is formed by the resin-impregnated fiber strip and which is circumferentially closed there is preferably arranged an outer film tube which may have a nonwoven layer which faces the layer of fiber material and which is laminated onto a plastics material film which is used to form the outer film tube. Around the outer film tube which is preferably produced from a multi-layer film having a styrene barrier, in particular a PE-PA-PE film, on the internal PE layer of which the nonwoven layer is laminated by means of a melting operation, there is preferably arranged a tear-resistant, preferably fabric-reinforced protective film which has a similar structure and material properties to a truck tarpaulin or a tear-resistant packing film and the longitudinal edges of which are connected over the length of the lining tube, for example, by means of adhesive tape or a welded or adhesively bonded resilient film portion. This resilient film portion which may also be formed by means of a strip of adhesive tape with a corresponding width is, when the lining tube is expanded, separated in the manner of a desired breaking location and thereby enables a radial expansion of the otherwise tear-resistant and almost non-expandable outer protective tube to the respective inner diameter of the sewer shaft. The desired breaking location may, however, also be introduced in another form, for example, as a perforation, into the protective tube which is formed in an overlapping manner from one, two or more film webs by means of adhesive bonding or welding at the edges and which is also referred to below as an additional outer film tube.

The inner film tube has a connection portion which extends in the longitudinal direction thereof and which connects two circumferential portions of the inner film tube which extend parallel with each other to form a circumferentially closed inner film tube with a defined nominal diameter DN which preferably corresponds to the diameter of the upper first shaft portion. The connection portion comprises according to the invention a desired breaking location which extends along the inner film tube and which can be separated by introducing a pressurized medium, in particular compressed air, in a circumferential direction so that the inner film tube and the layer of fiber material which is arranged thereon can expand radially beyond the nominal diameter of the unopened inner film tube, which substantially corresponds to the diameter of the first upper smaller shaft portion, by more than 10%, preferably more than 30% to the larger diameter of the second lower shaft portion. This affords the advantage that the circumferentially closed inner film tube with the unopened desired breaking location during the production of the lining tube on a winding machine can act as a base tube around which fiber strips are wound and which has a well-defined nominal diameter DN and protects the winding mandrel of the winding machine from direct contact with the resin-impregnated fiber material.

This inner film tube which permits a significant laminate expansion is consequently the first layer around which the layer of fiber material in the preferred embodiment is wound in an endless manner over an internal winding mandrel in known manner. The lining tube can thus advantageously be produced in conventional manner, packaged and delivered to the construction location.

In contrast to a known, wound lining tube which is used to restore horizontally extending sewers and pipelines having a substantially constant diameter, the layer of fiber material which is arranged in the manner of a tube around the inner film tube in the case of the lining tube according to the invention is formed from a fiber tape which is wound in an overlapping manner and which, compared with fiber tapes which are used in conventional lining tubes, enables a significantly higher longitudinal expansion. This increased longitudinal expansion which when viewed in the longitudinal direction may be at least 10%, but preferably more than 30% or even 50% with respect to the length of the unexpanded fiber tape, enables the glass fiber tapes of the wound fiber layer to be able to expand more powerfully in a radial direction so that the layer of fiber material can expand its diameter in a radial direction to the respective diameter of the second shaft portion in order to be placed on the inner wall of the expanded shaft portion.

Producing such a glass fiber tape with a high longitudinal expansion is known in the prior art. When winding or placing the resin-impregnated fiber tapes of the lining tube according to the invention, it is accordingly taken into account that, as a result of the high radial expansion, the wall thickness of the laminate is accordingly reduced so that the material thickness of the fiber tapes which are wound in a helical manner one above the other is increased by a corresponding degree in order to produce the layer of fiber material with a corresponding overdimension which ensures the required strength in the finished product after the expansion and curing.

The high expandability of the fiber tape(s) which is/are used in the layer of fiber material is further also advantageous in alternative embodiments of the lining tubes according to the invention in which the layer of fiber material is not wound but instead is placed as a mat in an overlapping manner around the inner film tube with the desired breaking location formed thereon.

The lining tube according to the invention is characterized in that the radially expandable layer of fiber material is closed at a first end, which can be inserted into the channel of a sewer, of the lining tube by a seam which extends orthogonally with respect to the longitudinal axis of the lining tube. This seam which extends in a transverse direction is preferably obtained by the lining tube being configured in a flat manner and the ends thereof being sewn from the outer side with a suitable sewing material, for example, a plastics material thread, so that the end of the lining tube which is introduced into the sewer shaft first is closed by means of the transverse seam.

As already mentioned above, an outer film tube is preferably arranged around the layer of fiber material. This tube has a first longitudinal slot which rises at a first end of the seam and a second longitudinal slot which rises at a second end of the seam, which preferably extend parallel with the longitudinal center axis of the lining tube. Although the two longitudinal slots can also be introduced after the sewing of the first end of the layer of fiber strip into the outer film tube, the slots are preferably introduced before the seam is applied, for example, using a knife or pair of scissors.

This affords the possibility that according to another embodiment of the invention between the inner layer of the outer film tube and the outer side, which is defined between the first and second longitudinal slots, of the layer of fiber material, a lubricant, preferably silicone oil, can be applied in order to reduce the friction between the inner layer of the outer film tube and the fiber material. As the Applicant has recognized, when expanding the lining tube by means of compressed air being introduced, folds can thereby surprisingly be avoided in the transition regions between the sewer wall and the berm and/or the berm and the channel which would otherwise be produced without such a lubricant when the highly expandable fiber material which rests with the seam on the base of the channel is expanded in accordance with the shape of the channel and the berm and adapts to the shape thereof. As the Applicant was further able to recognize, the reduction of the folds in the transition regions mentioned in the base of a sewer shaft when the lining tube is expanded in addition to the lubricant is also further promoted by the high expandability of the fiber material used of preferably more than 30%.

In order to enable the smoothest possible abutment of the fiber material against the inner wall of the channel and the berm, the first longitudinal slot and the second longitudinal slot preferably have a length which substantially corresponds to the width of the berm plus half of the winding of the inner wall face of the channel.

As has further been recognized by the Applicant, when an outer film tube is used it must also accordingly expand more in a radial direction than in a conventional lining tube. This can be achieved either with generally expandable films or a desired expansion joint, as described, for example, in the German Patent Application (DE 10 2011 103 001 A1). Alternatively, it is possible to weld the outer film tube which after winding/placing the fiber tapes and applying the longitudinal drawstring is welded from two flat films to form a tube, generally in a slightly wider manner, that is to say, with a larger diameter which exceeds the diameter of the first sewer portion having a small inner diameter. To this end, for example, the flat film from which this tube is thermally welded can be selected to be so wide that the flat width thereof corresponds in total to the circumference of the second shaft portion with an increased inner diameter. So that this welded outer film tube which is welded with an additional overdimension of, for example, 50% can be easily handled during transport to the construction location and when pulled into a sewer shaft, the flat films are preferably folded longitudinally and releasably fixed to each other with adhesive tape.

In order to ensure that the tubular inner film of the inner film tube is wound or placed around the fiber material (laminate), during the entire expansion operation, in which the inner film tube and the layer of fiber material which is arranged thereon is expanded by means of compressed air which is introduced in the sewer shaft to the desired diameter, and also remains air-tight during the subsequent curing with UV light, another inner film tube is arranged in the interior of the inner film tube according to the invention. This may, for example, already be introduced into the inner film tube from the front during the production of the lining tube when this is produced on a winding mandrel as described in the above-mentioned WO-A 95/04646. Preferably, however, the additional inner film tube is first introduced into the lining tube at the construction location, which is possible with little complexity with lining tubes for lining sewer shafts as a result of comparatively small lengths of only up to 6 m.

Although the prefabrication of the lining tube can optionally also be carried out during its production in the factory, it is preferably manufactured at the construction site with the inner film tube which has the desired breaking location. To this end, the lining tube is shortened in accordance with the depth of the sewer shaft to be restored to the currently required length and the transverse seam is introduced into the lower end of the layer of fiber material which is associated with the base of the sewer shaft. This is preferably carried out by means of placing one over the other and sewing the lower edge of the layer of fiber material in an overlapping manner. Before or also after the sewing of the lower edge, the two longitudinal slots are introduced into both longitudinal edges of the outer film tube, wherein the lining tube with a horizontal seam is preferably arranged flat on a lower layer. After the two longitudinal slots have been introduced into the outer film tube, the two film portions which are located between them are folded over and the outer side of the layer of fiber material is coated or also sprayed with the above-mentioned lubricant and the portions which have been folded back are then folded back into their original position again.

Subsequently, the additional inner film tube which preferably comprises the same film as the inner film tube is introduced into the lining tube.

The additional inner film tube, the diameter of which corresponds at least to the increased diameter of the second shaft portion, is to this end closed at the end thereof with a knot or cable tie so that there is produced a film bag which is preferably approximately 10-20% longer than the fabricated piece of the lining tube which is intended to be inserted into the sewer shaft.

The lining tube which is produced to the desired shaft depth is then closed at the upper end thereof with a known packer and lowered by means of a crane into the shaft construction site until the second end which is closed by the seam rests on the so-called berm, that is to say, the transition between the cylindrical portion of the sewer shaft and the so-called channel. In this instance, the lining tube which is suspended on the packer is orientated by rotating the packer in such a manner that the transverse seam extends in the longitudinal direction of the channel so that the seam comes to rest completely in the channel and the fiber material which is arranged at both sides of the seam rests on the berm when the lining tube has been fully lowered into the sewer shaft.

Subsequently, the second inner film tube is introduced by the packer from above into the lining tube and a UV light source is suspended from above.

Subsequently, the lining tube with the inserted additional inner film tube (air bag) which has a significantly larger diameter than the first shaft portion or the inner film tube which has not been separated is closed by means of the packer and the interior of the air bag is acted on with compressed air by means of an external compressed air source. The additional inner film tube is thereby expanded and first rests on the inner film tube which has the desired breaking location and which is adhesively bonded or thermally welded and the diameter of which substantially corresponds to the diameter of the first smaller shaft portion.

If the pressure is further increased, the adhesive/weld seam (desired breaking location) of the inner film tube tears so that it from then no longer exerts any resistance against additional expansion. This enables the layer of fiber material which has a diameter which substantially corresponds to the diameter of the first upper (smaller) shaft portion to be able to expand radially further.

Since the diameter of the additional inner film tube is identical or preferably slightly greater than the diameter of the cylindrical lower portion of the sewer shaft, the additional inner film tube is not subjected to expansion either in the upper first shaft portion or in the lower second shaft portion so that this additional inner film tube (air bag) can rest in the first shaft portion in a tension-free manner against the inner wall of the inner film tube which is closed along the desired breaking location and in the second increased shaft portion—and, in the conical transition portion which connects the two shaft portions—after bursting the desired breaking location of the inner film tube, can rest against the inner wall of the layer of fiber material. It is thereby advantageously ensured that the additional inner film tube on the whole remains air-tight and in spite of the open desired breaking location in the inner film tube no compressed air can be discharged through the layer of resin-impregnated fiber material which would lead to a blowing out of reaction resin and a resultant weakening of the cured laminate.

As a result of the expansion of the additional inner film tube (air bag), the fiber material resting on the channel and the berm is also expanded in the region around the transverse seam and urged against the faces of the berm and the channel which can be seen from above. In this context, it could be observed by the Applicant that the portions of the layer of fiber material which were coated with the lubricant, as a result of the reduced friction and the increased expandability of the fiber material by preferably more than 30% and the expansion of the film material of the additional inner film tube, rest in an almost fold-free manner on the surfaces of the berm(s) and the channel when the lining tube is completely expanded.

As the Applicant has further recognized, the additional inner film tube is absolutely necessary in the restoration of sewer shafts since in contrast to conventional lining tubes for the restoration of horizontally extending sewers and pipelines in the lower shaft portion no second packer can be used to close the lining tube.

It has been found to be particularly advantageous in this context that, as a result of the use of the above-described embodiment of the method according to the invention, the berm and the channel of a sewer shaft can be lined in one and the same working operation.

According to another notion which forms the basis of the invention and which affords the possibility of additionally securing the lining tube against rising upward within the sewer shaft, before the lining tube which is closed at the lower end thereof by means of the seam is introduced into the sewer shaft, retention elements, in particular blocks and/or shortened rungs and/or grooves are fitted to the inner wall of the first and/or second shaft portion. They are covered after the lining tube has been completely lowered by the outer side of the outer film tube and the fiber material which is arranged therein with a local radial bulge of the fiber material being formed when the additional inner film tube is expanded and the layer of fiber material, with retention elements which protrude inward in a convex manner, pressing around them against the inner wall. With recesses, such as holes, which are introduced in the region of the base of the sewer shaft in the inner wall thereof, the highly expandable fiber material which is impregnated with liquid reaction resin is pressed by the additional lining tube locally into the respective recess, whereby the layer of fiber material bulges radially outward into the recess.

After the curing of the reaction resin, these local bulges of the cured fiber material form a positive-locking connection which counteracts the lifting forces which are produced as a result of ground water which penetrates into the base of the fragile old sewer and attempts to force upward the cured lining tube which is sealed with respect to the ground water.

In other words, the local radial bulges of the fiber material engage behind the retention elements in the sewer shaft which are securely connected to the wall of the sewer shaft or are formed therein, after the expansion and curing of the lining tube in a positive-locking manner and mechanically fix the tube in the base of the sewer shaft.

The invention is described below with reference to the drawings and preferred embodiments.

DETAILED DESCRIPTION OF THE INVENTION

Figure 1:
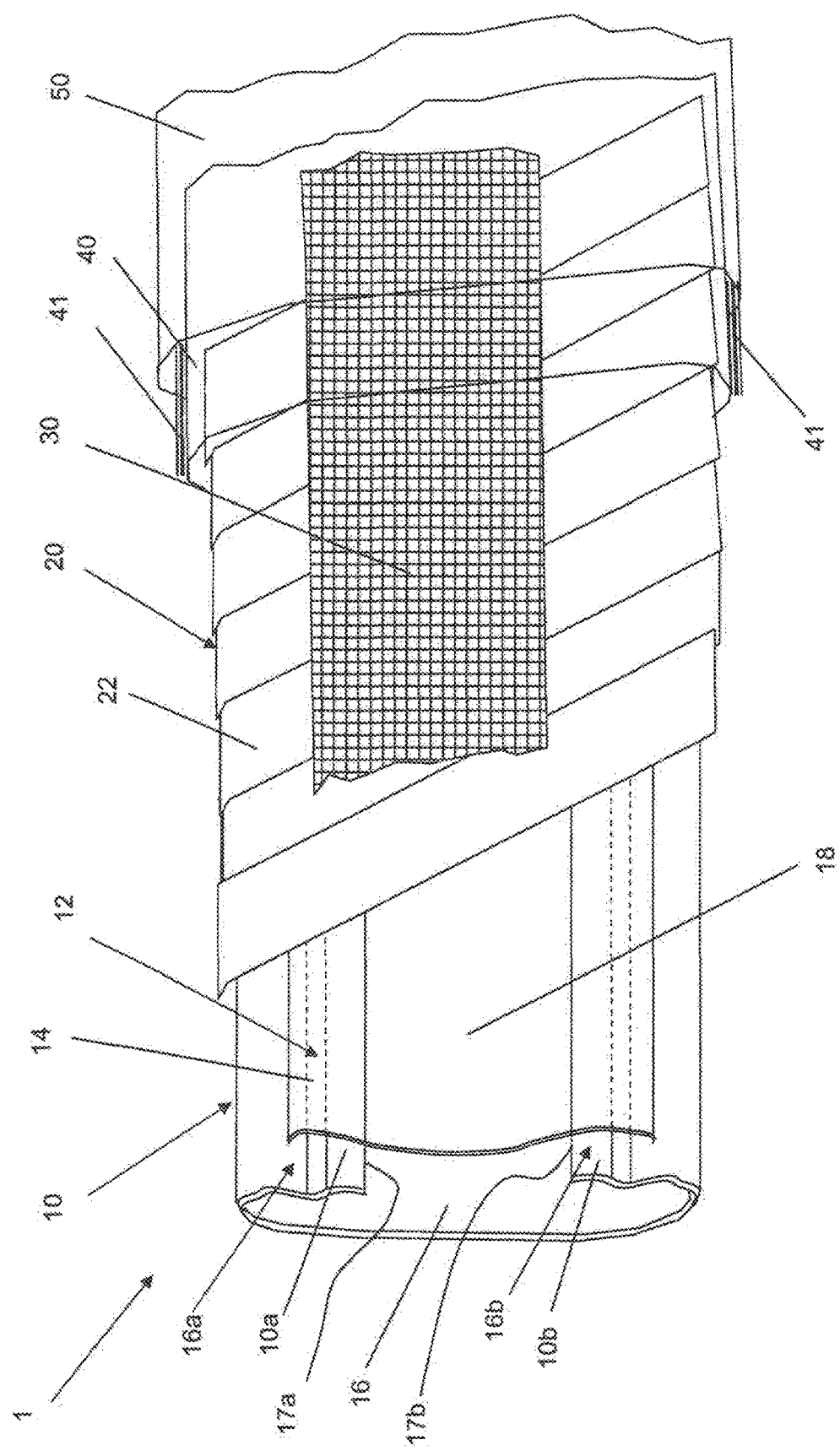
FIG. 1 shows a schematic partially transparent plan view of a lining tube according to the invention prior to the seam being introduced.
Figure 2A:
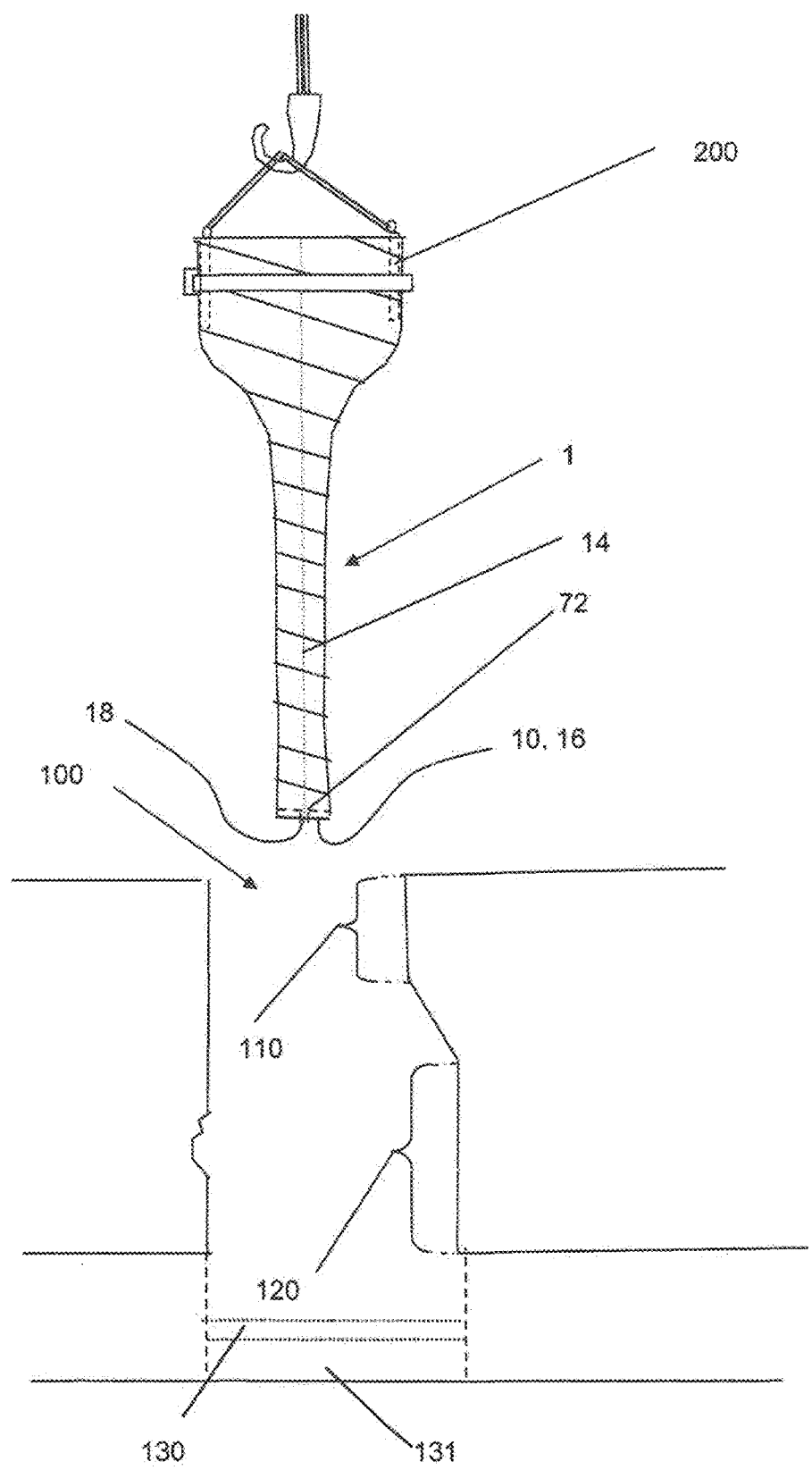
FIG. 2*a* shows a schematic illustration of a sewer shaft which is intended to be restored with the berm and channel being indicated prior to the introduction of a lining tube according to the invention.

As shown in the illustration of FIG. 1, a lining tube 1 for restoring a defective sewer shaft 100 which is illustrated in FIG. 2*a* and which has a first shaft portion 110 having a first diameter and an adjacent second shaft portion 120 having an expanded diameter, comprises an inner film tube 10 and a radially expandable layer of fiber material 20 which is arranged around it and which is impregnated with a curable reaction resin.

The inner film tube 10 has a connection portion 12 which extends in the longitudinal direction thereof and which connects two circumferential portions 10*a*, 10*b* of the inner film tube 10 which extend parallel with each other to form a circumferentially closed inner film tube with a defined nominal diameter DN. The connection portion 12 comprises a desired breaking location 14 which extends along the inner film tube 10 and which can be separated by introducing a pressurized medium, in particular compressed air, from a compressed gas source 6 (FIG. 2*e*) into the inner film tube 10 in a circumferential direction so that the inner film tube 10 and the layer of fiber material 20 which is arranged thereon can be expanded radially beyond the nominal diameter which substantially corresponds to the diameter of the first upper smaller shaft portion 110 (FIG. 2*a*) by more than 10%, preferably more than 30% and in a particularly preferred manner by up to 50% to the expanded diameter of the second lower shaft portion 120. Thus, in practice, with a conventional sewer shaft 100 having a shaft depth of from 2 to 5 m, the smaller diameter of the upper shaft portion may, for example, be 600 mm and the diameter of the lower cylindrical second shaft portion 120 may, for example, be 1000 mm, wherein a conical transition portion is formed between the first and second shaft portion 110, 120.

In a preferred embodiment of the invention, in order to form the inner film tube 10 there is used at least one transparent flat film 16 which is formed, for example, by laying to form a tube, and the longitudinal edges 17a, 17b of which, as shown in FIG. 1, extend with spacing from each other and are connected to each other by means of a transparent film strip 18 which is adhesively bonded to the outer side or thermally welded thereto. The desired breaking location 14 extends in this embodiment which is very cost-effective to produce and which is shown in FIG. 1 along one or two longitudinal weld seams or adhesive locations, along which the transparent film strip 18 is connected to the corresponding circumferential portions 10a, 10b of the similarly transparent flat film 16 from which the inner film tube 10 is formed.

Figure 3:
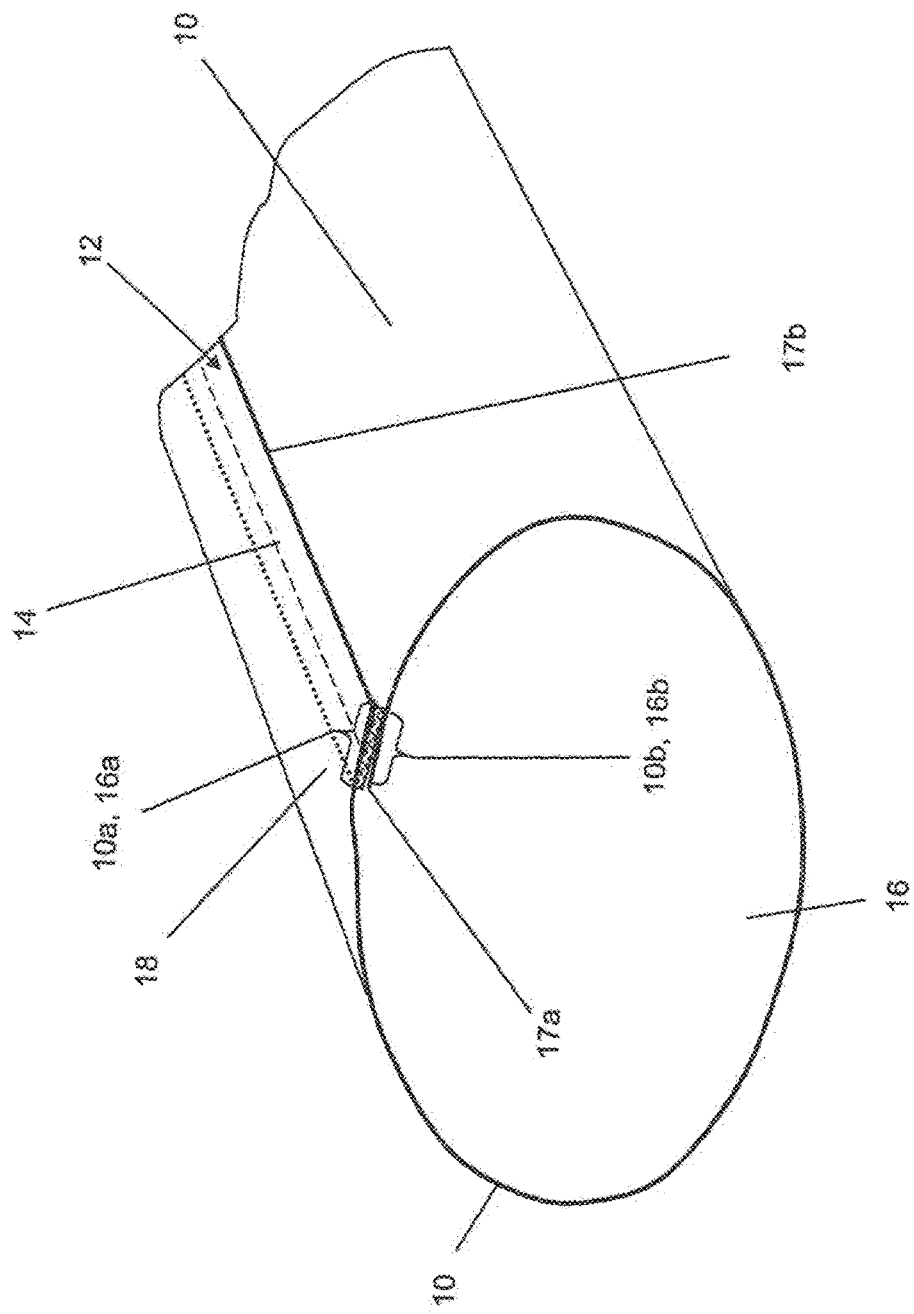
FIG. 3 shows a schematic partial illustration of a preferred embodiment of an inner film tube which is inserted into the lining tubes according to the invention with a desired breaking location.

In another embodiment of the invention which is shown in FIG. 3 and which is particularly simple and cost-effective to produce, the inner film tube 10 comprises at least one flat film 16 which is formed into a tube and the edge portions 16a, 16b of which are guided over each other in an overlapping manner and connected to each other, for example, by means of an adhesive which is indicated only schematically in FIG. 3, for example, a dual-sided adhesive tape, or by means of thermal welding. Alternatively, the edge portions 16a and 16b may also be connected to each other by means of a transparent adhesive tape. The two above-described embodiments of the inner film tube according to the invention afford the advantage that another circumferentially closed, preferably seamless inner film tube may be placed therein and, for example, is produced as cost-effective endless rolled products before the two circumferential portions 10a, 10b are adhesively bonded or welded to each other. In this embodiment, the resin-impregnated fiber tapes of the layer of fiber material are in a particularly advantageous manner placed around the adhesively bonded/welded inner film tube in an overlapping manner. The fiber tapes are in this instance in the form of individual mats which have a length which corresponds to the length of the lining tube to be produced. In this embodiment, the width of the mats is slightly, for example, 10% greater than the inner circumference of the second enlarged shaft portion 120, whereby it is ensured that the layer of fiber material can expand by means of circumferential displacement of the longitudinal edges of the mat, which are guided in an overlapping manner, to the second larger diameter, but in this instance always remains circumferentially completely closed when the layer of fiber material has been placed on the second shaft portion with the larger diameter.

In order in the above-described embodiments of the inner film tube 10 which is produced by means of overlapping adhesive bonding/welding of a flat film 16 to prevent a discharge of compressed air through the seam locations which are sometimes not completely closed or through the open desired breaking location 14 in the region of the second shaft portion 120 with an increased diameter, there is arranged within the welded/adhesively bonded inner film tube 10 another inner film tube 60 made of an air-tight transparent plastics material film, one end of which can be closed in an air-tight manner by means of welding or by means of a sealing element 62, in particular a cord which is wound around the outer side of the additional inner film tube 60 or a cable tie in order to form an air bag 64 which is closed at one side. Although the additional inner film tube 60 can already be placed in the inner film tube 10 during production in the factory, it is preferably inserted only at the construction site, in particular after the lining tube 1 has been introduced into the vertical sewer shaft 100, into the interior of the inner film tube 10, wherein the lower free end of the additional inner film tube 60 in order to form the air bag 64 which is closed at one side is previously closed in an air-tight manner by means of welding or by means of a sealing element 62.

Figure 4:
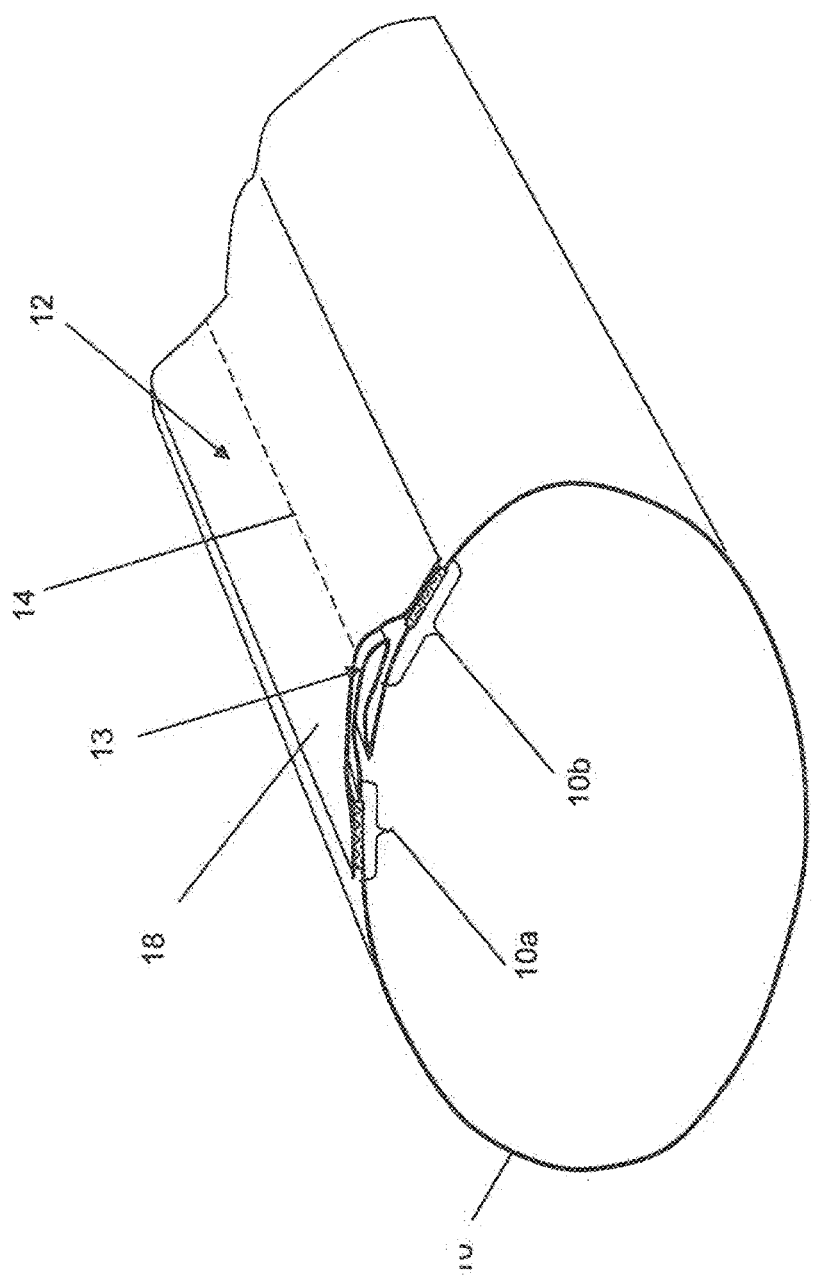
FIG. 4 shows a schematic partial illustration of another embodiment of a seamless inner film tube which is inserted into the lining tubes according to the invention with a desired breaking location which contains a film loop which is bridged by a film strip.

According to another alternative embodiment of the invention, the inner film tube 10 may be a film tube which is seamless in the circumferential direction and which has a circular cross section having a diameter which is more than 10%, preferably more than 40% of the nominal diameter of the first shaft portion 110 and which preferably corresponds to the diameter of the second enlarged shaft portion 120 of a sewer shaft 110 which is intended to be restored. The two outer circumferential portions 10a, 10b of the seamless film tube 10 which are arranged adjacent to each other are in this embodiment of the invention as shown in FIG. 4 connected in the region of the connection portion 12 with a film loop 13 which extends in the circumferential direction of the inner film tube 10 and which extends over the length of the inner film tube 10 being formed by means of an adhesively bonded or thermally welded-on transparent film strip 18 which bridges and covers the film loop 13. There is thereby advantageously provided a connection portion having a desired breaking location 14 which extends in FIG. 4 along the first and second circumferential portion 10a, 10b by way of example in the region of the adhesive location or weld seam and which is indicated schematically by the broken lines in FIG. 4. When inserting and expanding the inner film tube 10 of the embodiment of FIG. 4, it is insignificant whether the right or left weld seam/adhesive location in the illustrations tears open when the lining tube 10 expands in the expanded second shaft portion 120 since, as a result of the inner film tube 10 which is completely closed in the circumferential direction, a closed air volume in the interior of the lining tube 1 which reliably prevents the reaction resin from blowing out when it expands is always ensured.

In order, with a layer of fiber material 20 which is obtained by means of overlapping helical winding, to ensure a sufficiently high circumferential expandability of the layer, it has at least one fiber tape which is wound in a helical, overlapping manner, in particular a glass fiber tape 22, the fiber material of which has an expandability in the longitudinal direction of more than 10% with respect to the entire length of the tape. As found by the Applicant, this large longitudinal expansion enables a correspondingly large radial expansion of the layer 20 which is produced from the fiber tape which is wound in a helical, overlapping manner by more than 10%, in particular more than 30%, up to 60%, without a significant shrinkage occurring in the longitudinal direction of the lining tube 1.

As can further be seen in the illustration of FIG. 1, in the embodiments of lining tubes 1 described above on the layer of fiber material 20 there is preferably arranged at least one longitudinal draw string 30 which extends in the longitudinal direction of the lining tube 1. The longitudinal draw string 30 preferably comprises continuous glass fibers or glass fiber rovings which preferably extend over the entire length of the lining tube and which absorb the axial forces when the lining tube 1 is inserted, for example, by means of a crane into a defective sewer shaft 100 which is intended to be restored.

As can be seen in the illustration of FIGS. 2a to 2e and 5, the radially expandable tubular layer of fiber material 20 at a first end 70 which can be introduced into the channel 131 of the sewer shaft 100 and which is also referred to as the lower end is closed by means of a seam 72 which extends orthogonally with respect to the longitudinal axis L of the tubular layer of fiber material 20. The seam 72 is indicated only schematically in FIG. 5, and may, for example, have additional knots between the puncture locations by means of which the two sewn lower edge portions of the fiber material 22 are further locally secured against sliding and displacement in the region of the first end 70 of the layer of fiber material 22. The inner film tube is preferably still present in the seam region but can also be locally removed around the seam 72.

Around the tubular, radially expandable layer of fiber material 20, there is preferably arranged an outer film tube 40 which has a diameter which is greater than or equal to the diameter of the additional inner film tube/air bag 64 and which preferably forms a barrier which prevents the discharge of harmful substances, in particular styrene, from the reaction resin into the surrounding soil. The outer film tube 40 may additionally be surrounded by an additional outer film tube 50 (FIG. 1) which comprises a reinforced, tension-resistant material which is impermeable to UV light, in particular made of a fabric-reinforced plastics material film which is provided with a circumferentially expandable portion which, when the lining tube expands, from a predetermined excess pressure, for example, 0.2 bar, in the second shaft portion 120 bursts in a similar manner to the desired breaking location 14 and enables a radial expansion of the layer of fiber material 20.

As can be seen in this instance in detail in the illustration of FIG. 1, the outer film tube 40 comprises a first longitudinal slot 42a which rises at a first end of the seam 72 and a second longitudinal slot 42b which rises at the second end of the seam 72 and which is advantageously introduced prior to the sewing of the lower edge of the layer of fiber material 20 into the two lateral weld seams 41, by means of which the outer film tube 40 is formed from two flat films which are made of a thermoplastic plastics material and which are placed around the layer of fiber material (2) and which are guided one over the other on the longitudinal edges in known manner by means of thermal welding. The two longitudinal slots 42a, 42b may, for example be obtained by opening or separating the lateral weld seams 41 and each have a length which preferably substantially corresponds to the width of the berm 130 plus half of the winding of the inner wall face of the channel 131. If the berm, as illustrated in FIG. 5, is composed of two individual lateral berms 130, the total mentioned above corresponds to the sum of the width of the two individual berms 130.

Figure 5:
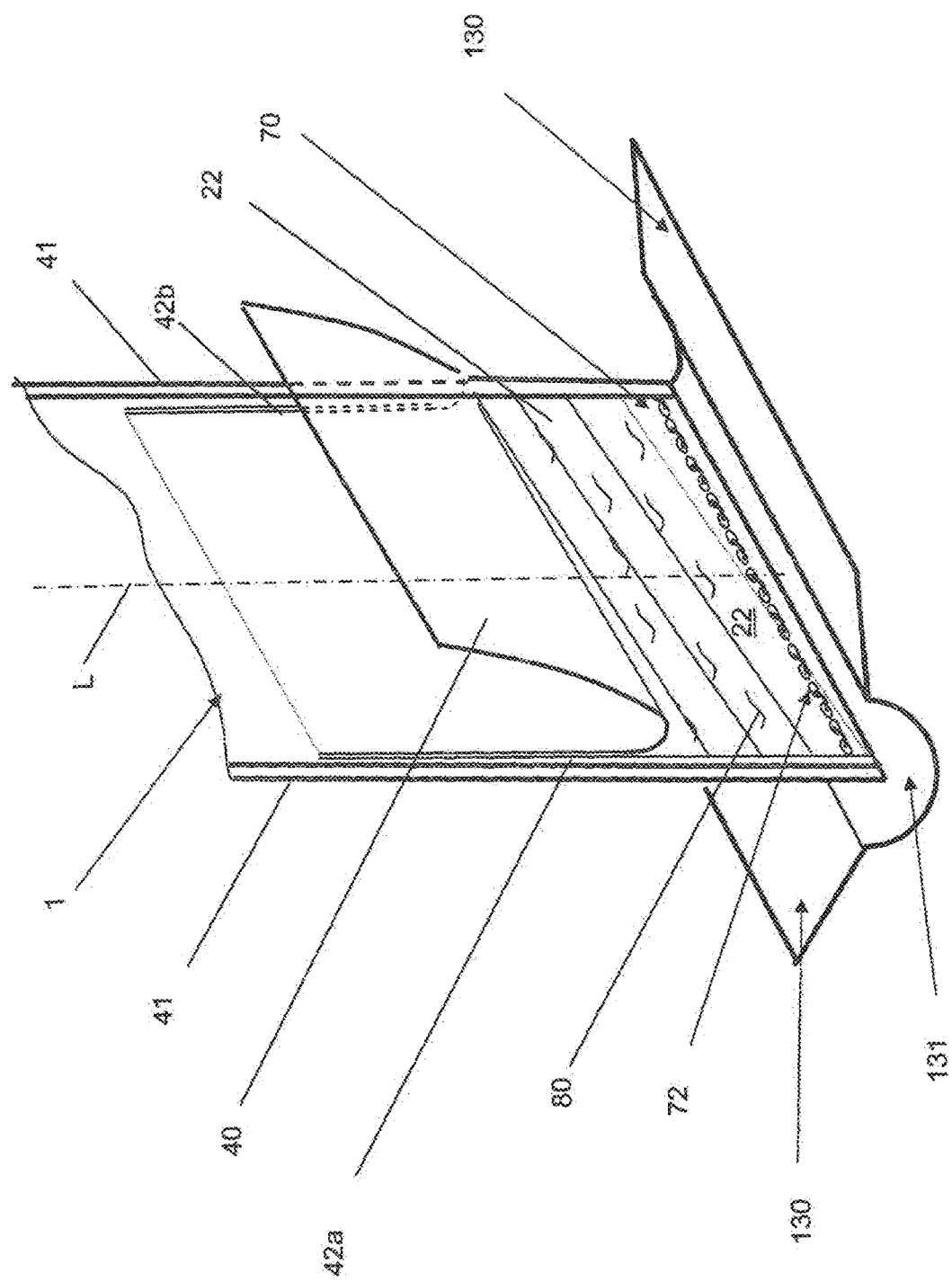
FIG. 5 shows a cross sectional view of the lower first end of a lining tube according to the invention which has been lowered into the channel in order to explain the orientation of the seam relative to the channel.

In order to advantageously prevent the formation of folds when the lining tube 1 expands in the region of the channel 131 and the berms 130, in the preferred embodiment of the invention, there is provision between the inner side of the outer film tube 40 and an outer portion, which is defined between the first and second longitudinal slots 42a, 42b, of the tubular layer of fiber material 20 for a lubricant 80, preferably silicone oil, which in the illustration of FIG. 5 is indicated only schematically by the wave-like short lines 80 to be applied. If an additional outer film tube 50 is further used, this is also separated along the longitudinal slots 42a, 42b in order to be able to introduce the lubricant 80 and to facilitate the placement of the fiber material of the layer 20 in the region of the channel and the berms.

According to another notion forming the basis of the invention, a method for producing a lining tube 1 described above is characterized by the following method steps:

Firstly, a plastics material flat film 16 which is permeable to UV light is formed into a circumferentially closed inner film tube 10 with a predetermined nominal diameter. This is advantageously carried out by adhesive bonding or welding of the longitudinal edges 17a, 17b of the transparent plastics material flat film 16 in an overlapping manner and/or by adhesively bonding or thermally welding a transparent film strip 18 on two adjacent outer circumferential portions 10a, 10b, which extend parallel with each other, of the plastics material flat film 16 which is arranged in a tubular manner. There is thereby produced a connection portion 12 which has a desired breaking location 14 which extends in the longitudinal direction of the inner film tube 10. At the outer side of the inner film tube 10 which is formed in this manner with a desired breaking location 14, at least one circumferentially closed layer 20 made of fiber material is arranged by means of overlapping placement or overlapping helical winding of at least one resin-impregnated fiber tape 22, in particular glass fiber tape. The winding is in this instance preferably carried out on a winding apparatus, as described, for example in WO-A 95/04646.

In a particularly advantageous embodiment of the method, in the plastics material flat film 16 another transparent circumferentially air-tight closed inner film tube 60 which extends over the length of the lining tube 1 is placed before the plastics material flat film 16 is formed into the circumferentially closed inner film tube 10 and the seam 72 is introduced in the factory into the first lower end 70 of the layer made of fiber material 20.

Figure 6:
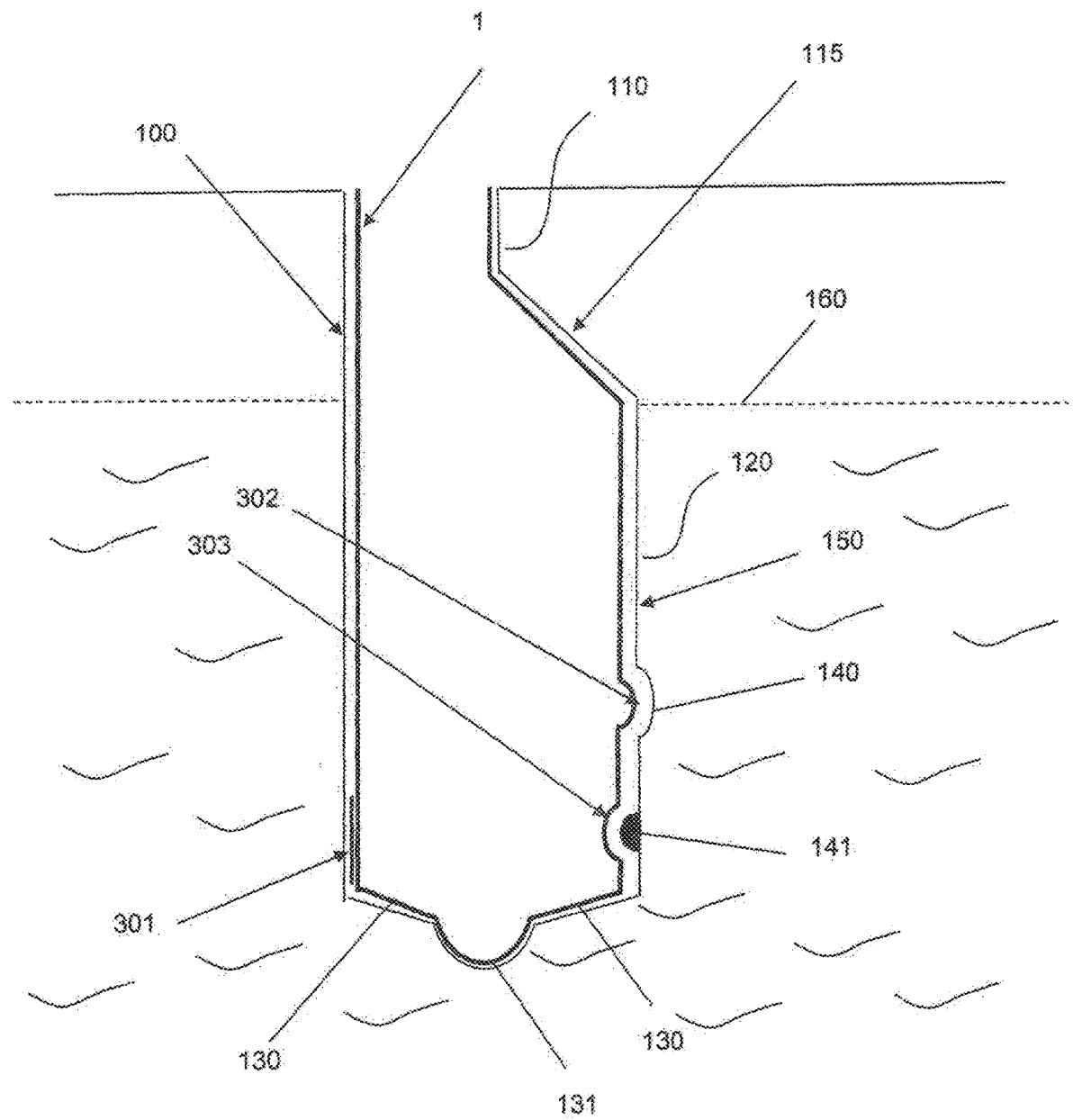
FIG. 6 shows a cross sectional view of a sewer shaft which is provided with additional convex and concave retention elements with a cured lining tube according to the invention which has been introduced therein and which is secured against rising up by means of a positive-locking connection between the retention elements and the cured fiber material.

With the lining tube 1 described, it is not only possible to line the cylindrical portions 110 and 120 and the conical portion 115 of the sewer shaft 100 but it is further possible to also line the transition between the second lower shaft portion 120 and the channel 131, that is to say, the so-called berm 130, without additional steps, as indicated in FIG. 6.

The lining tube 1 which is produced in the manner described above and which is provided in the factory with the seam 72 is subsequently transported to the construction location and installed at that location in a defective sewer shaft 100 which is intended to be restored, as shown in the illustrations of FIGS. 2a to 2e.

In this instance, an end of the lining tube 1 is initially secured for example, with a tensioning belt which is not illustrated in greater detail, to a known pot-like packer 200 which is retained with a crane which is not shown in greater detail above the sewer shaft 100. The packer 200 with the lining tube 1 secured thereto is subsequently, as shown in FIG. 2a, positioned in a vertical position above the sewer shaft 100, which has a first upper shaft portion 110 with a smaller diameter, for example, 600 mm, and a lower second sewer portion 120 with a larger diameter, for example, 1000 mm.

Figure 2B:
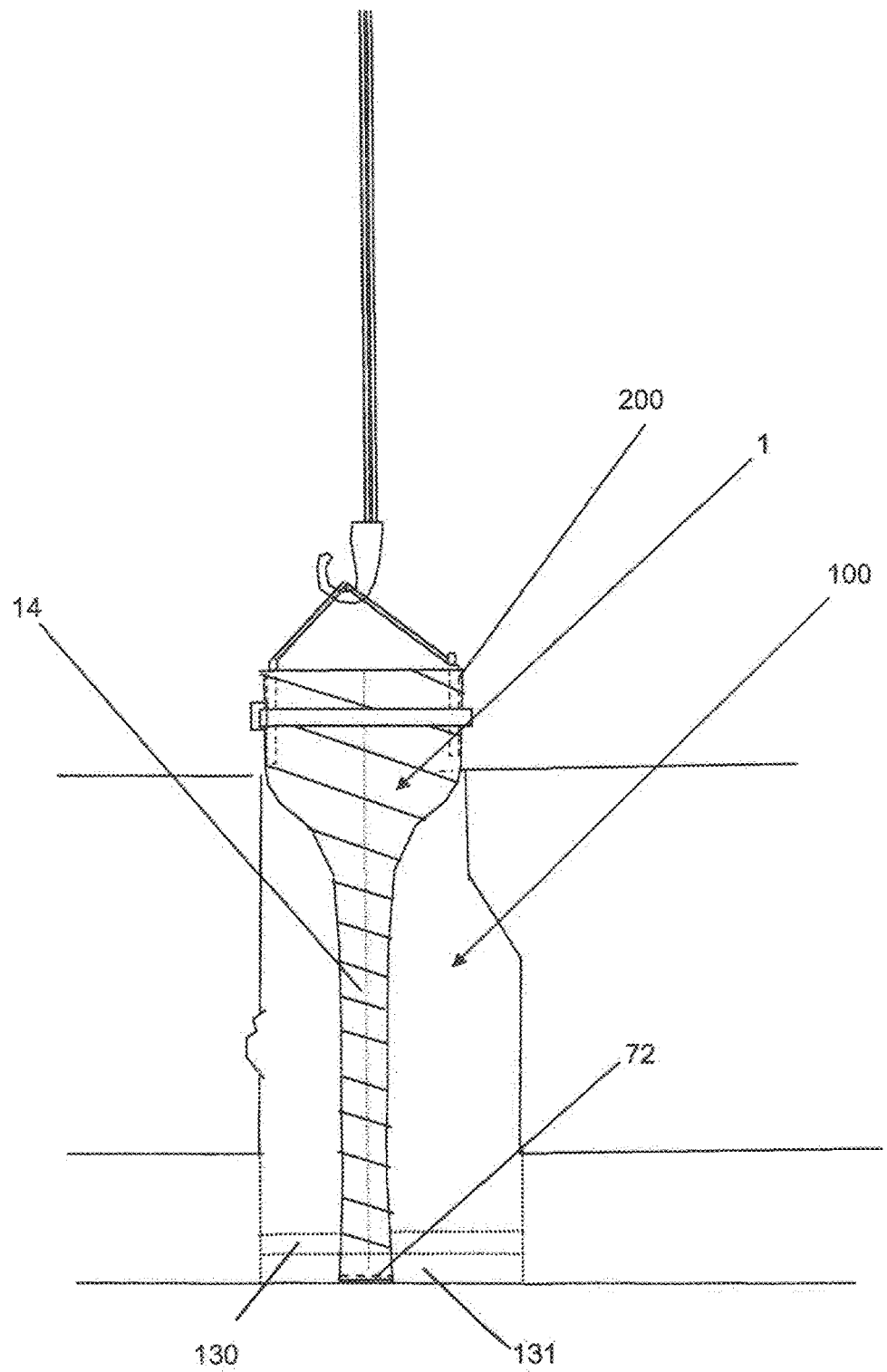
FIG. 2*b* shows the sewer shaft of FIG. 2*a* after the lining tube has been lowered.

Next, the packer 200 with the lining tube 1 secured thereto is lowered into the sewer shaft 100 until the lower end 70 of the lining tube 1 or the seam 72 rests on the base of the channel 131 of the sewer shaft 100 which in the same manner as the berm 130 in FIG. 2b is illustrated only schematically by dotted lines.

Figure 2C:
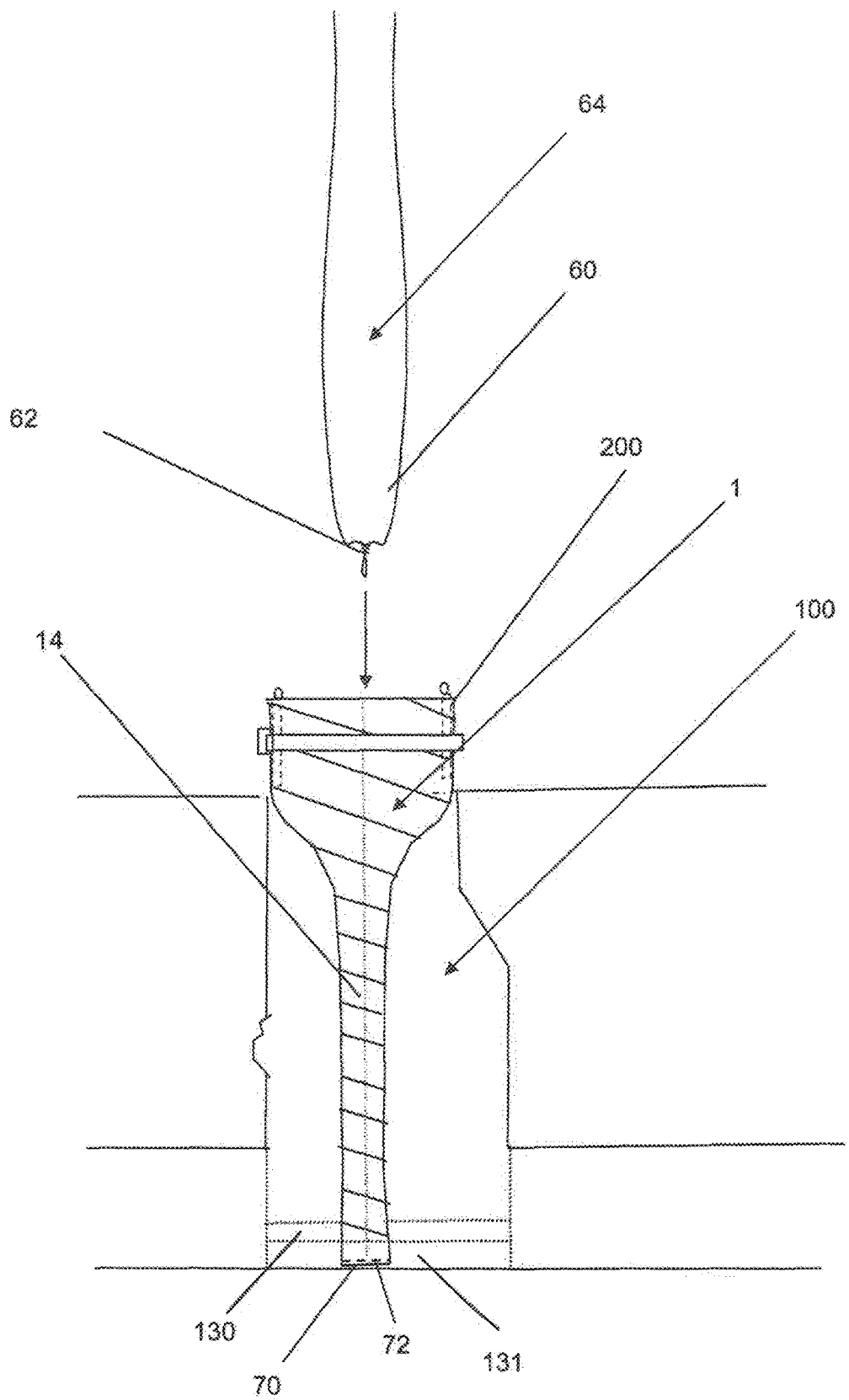
FIG. 2*c* shows the sewer shaft of FIG. 2*a* prior to the introduction of the additional inner film tube into the lining tube.
Figure 2D:
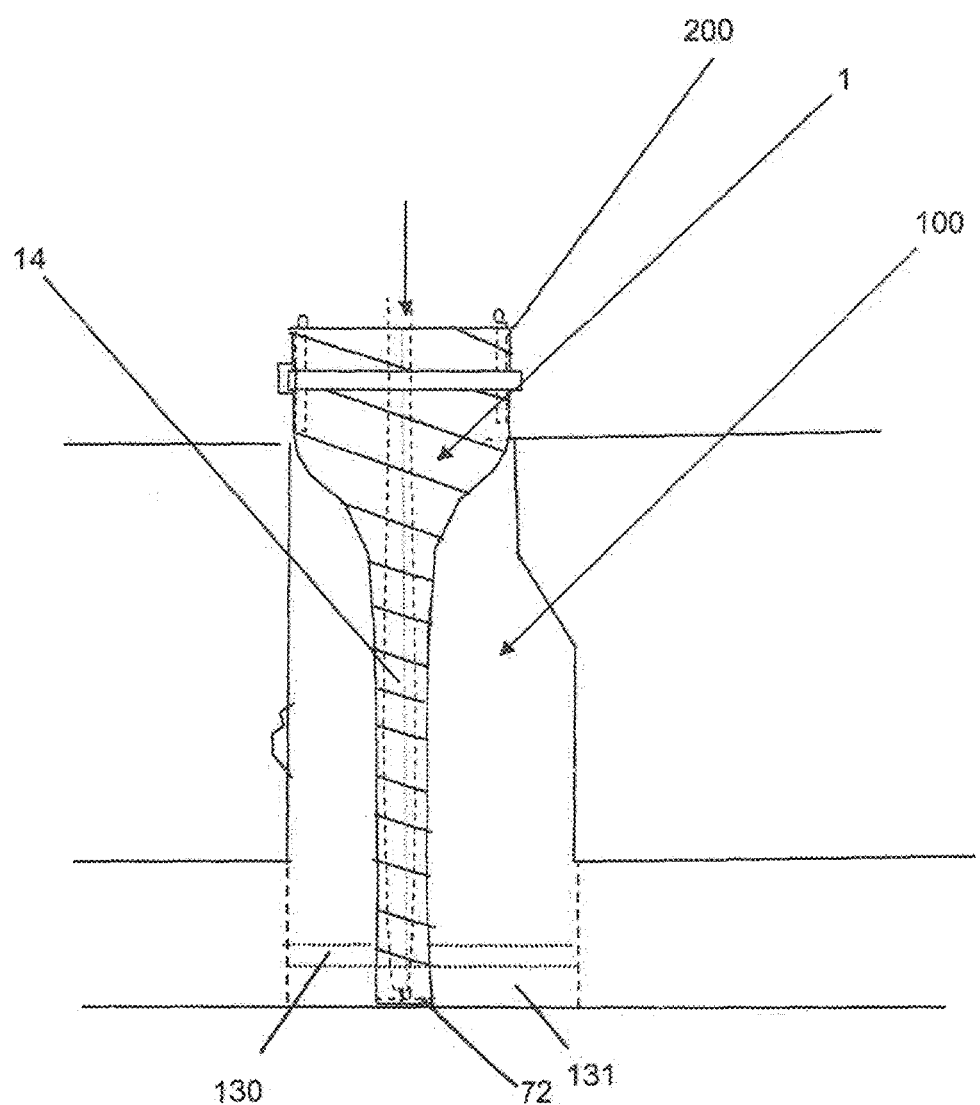
FIG. 2*d* shows the sewer shaft of FIG. 2*a* after the introduction of the additional inner film tube.
Figure 2E:
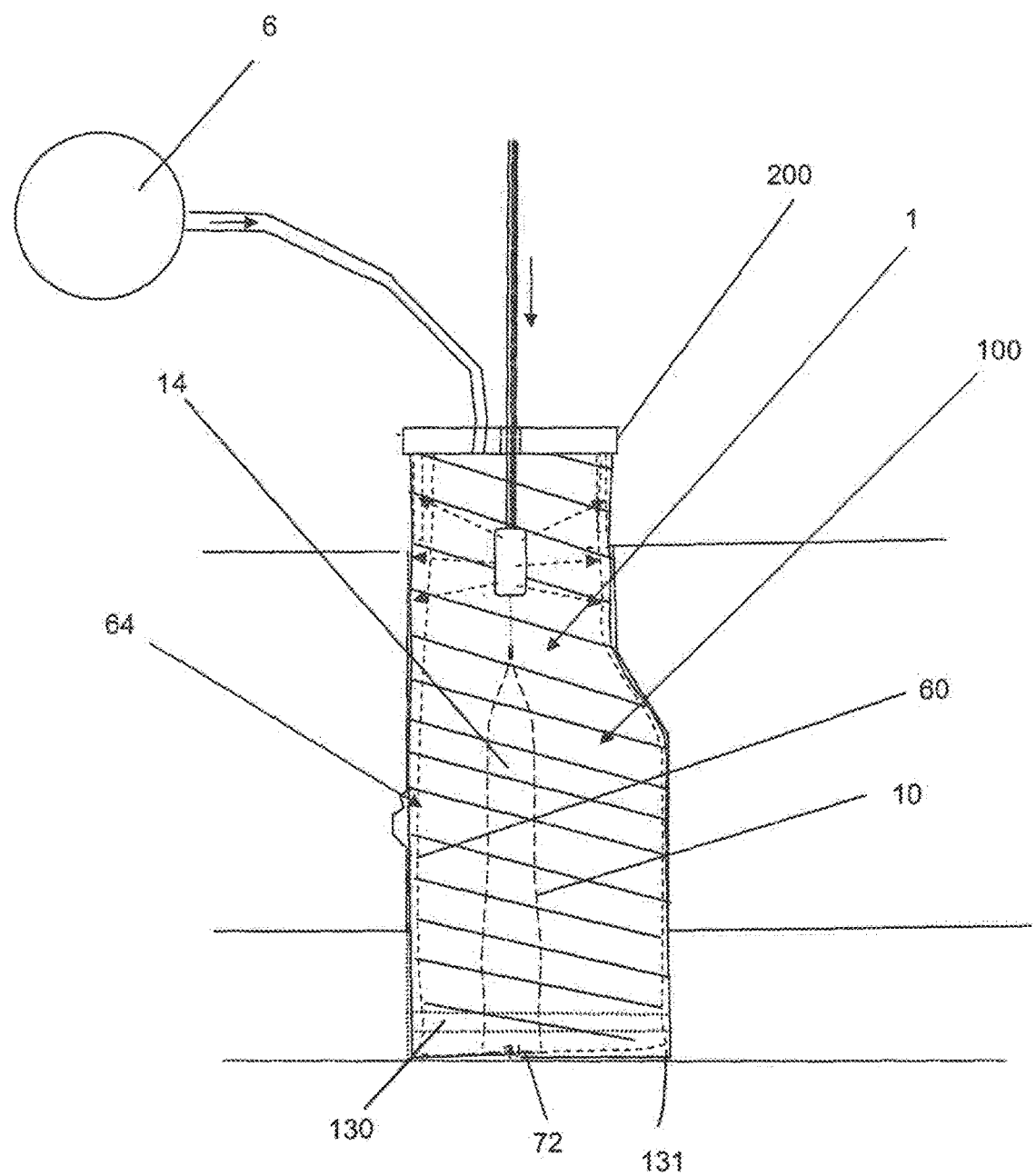
FIG. 2*e* shows the sewer shaft of FIG. 2*a* after the introduction of a radiation source and expansion of the lining tube and irradiation of the inner side of the layer of fiber material which is placed on the inner wall of the shaft portions of different widths.

Subsequently, an above-described additional inner film tube 60 which was previously closed at the base side, for example, by means of a sealing element 62 or by means of knotting, and which forms an air bag 64 which is closed at one side is introduced from above into the inner film tube 10 of the lining tube 1, as shown in FIGS. 2c and 2d.

In a last method step, the packer 200 is closed at the upper side thereof in known manner by means of a cover which is not described in greater detail and the interior of the air bag 64 is acted on with excess pressure in known manner by introducing compressed air from a compressed air source 6 through the cover of the packer 200. The inner film tube 10 is thereby placed in the region of the first sewer portion 110 on the inner side of the layer of fiber material 20 and urges it against the inner side of the first shaft portion 110, wherein the inner film tube 10 is closed along the desired breaking location 14. In the adjacent conical transition portion 115 and the second shaft portion 120 in which the sewer shaft 100 has a larger diameter than the nominal diameter of the inner film tube 10, the desired breaking location 14 tears as a result of the increasing pressure and enables the additional inner film tube/air bag 64 to be placed against the inner side of the partially exposed layer 20 of fiber material 20 and to expand it radially and to press it against the inner wall of the second shaft portion 20.

Finally, the reaction resin in the layer of fiber material 20 is cured by introducing a UV radiation source which is not described in greater detail into the interior of the air bag 64, whilst the fiber material is pressed by the excess pressure in the additional inner film tube 60/air bag 64 at high pressure against the inner wall of the sewer shaft 100.

In the preferred embodiment of the invention, however, in order to line the berms 130 and the channel 131 a lining tube 1 which is not sewn in the factory but instead produced in conventional manner the manner described above and which is open at both sides is transported to the construction location and accordingly prepared. However, before the lining tube 1 is secured to the packer 200 as described above and suspended on a crane, at the first lower end 70 in a region which in terms of its length substantially corresponds to the width of the berm 130 plus approximately half of the developed view of the channel 131, the outer film tube 40 which is preferably a packing film which is made of a thermoplastic plastics material and which is longitudinally welded at both sides, is cut open, for example, along the weld seams 41, as indicated in FIG. 5. The film is folded back so that the resin-impregnated fiber material of the layer 20 is exposed. If provided, another outer film tube 50 which surrounds the outer film tube 40 is separated in the same manner at the height of the weld seams 41 and the lug-like regions of the tubes 40 and 50 are folded back. Afterwards, the inner sides of the layer of fiber tape 20 are placed flat one over the other and roughly sewn together along the seam 72. On the outer side of the exposed fiber tapes 22, a lubricant 80, for example, a silicone oil is applied, and subsequently the film of the outer film tube 40 and where applicable the additional outer film tube 50 is folded again on the outer side of the layer of fiber material 22 with the lubricant 80 which is applied thereto.

The initially flat lining tube 1 which is sewn together at the bottom is in this form secured with the other open end thereof to the packer 150 (FIG. 2*a*) and suspended by means of the crane in the shaft construction 100 in such a manner that it hangs down with the sewn-together end thereof into the channel 131 and is orientated with the seam 72 along the channel 131 (see FIG. 5). The orientation along the channel 131 can be implemented in a particularly easy manner with the lining tube 1 according to the invention since the diameter of the lining tube 1 corresponds at a maximum to the small, upper diameter 110 of the sewer shaft 100 and the possibility is thereby afforded of monitoring the precise position of the seam 72 whilst the lining tube 1 is introduced into the sewer shaft 100. In contrast, lining tubes of the prior art, the diameters of which are adapted to the different inner diameters of a relevant sewer shaft 100, have a diameter which instead corresponds to the diameter of the second expanded shaft portion 120 so that they have to be folded together for introduction through the first shaft portion with a reduced diameter 110.

In this lining tube 1 which has been prepared in this manner, the additional inner film tube 60 which is closed in a tight manner at the lower end and expanded with compressed air is used. When the lining tube 1 is expanded, it has a tendency to assume in principle a cylindrical shape, whereas the berms 130 and the channel 131 have a rather flat form. Since the fiber material of the layer 20, which is subsequently also referred to as a laminate, can slide in the region of the first lower end 70 as a result of the lubricant 80 on the film material of the outer film tube 40, it is possible to change the lining tube which is cylindrical per se to a rather flat form. As the Applicant has recognized, this is particularly only possible in that the fiber material of the lining tube 1, as mentioned above, has a very high expandability which enables in the transition from a cylindrical region into a more flat region the fiber material to be pressed simply as a result of the introduction and expansion of the air bag 64 in a substantially fold-free manner against the surfaces of the berms 130 and the channel 131.

After the curing of the reaction resin, which is preferably carried out in known manner by means of UV-light which activates photoinitiators contained in the reaction resin, portions of the cured lining tube 1 which protrude where applicable into the channel 131 and the sewer pipe are then separated in a final working step.

After the defective sewer shaft 100 including berms 130 and channel 131 has been restored, the restored shaft construction 150 forms a water-tight cylinder which is closed at the lower side, as indicated in FIG. 6. As a result of the ground water which is illustrated in FIG. 6 by the undulating lines, the cylinder which is closed at the bottom is subjected to buoyancy which with deep shaft constructions 100 and a high ground water level 160 leads to the buoyancy forces which are produced becoming so great that they can no longer be discharged by the upper conical portion 115 alone into the ground.

In order to overcome this without in an otherwise conventional manner drilling through the inner wall of the cured lining tube 1 a large number of holes in the restored shaft construction 150, into which screw/dowel connections are inserted in each case, in order to fix the cured lining tube 1 mechanically to the shaft construction, with the use of a lining tube 1 according to the invention as described above, it is possible to fix it mechanically with little complexity and additionally without subsequently introduced holes. The structure of the cured fiber composite material of the layer of fiber material 20 thereby remains undamaged, whereby it is ensured that the restored shaft construction 150 which is secured against buoyancy still complies with the required tightness requirements even after a number of years.

To this end, according to another notion forming the basis of the invention, a positive-locking connection between the old shaft construction 100 and the cured layer of fiber material 20 of the lining tube 1 according to the invention is produced. This has the advantage that the shrinkage which is generally inevitable with synthetic resin laminates does not lead to the resultant reduction of the outer diameter of the cured lining tube 1 applying an additional load to an adhesive connection which is described in greater detail below between the lining tube 1 and inner wall of the sewer shaft 100, which leads to the adhesive connection being more readily released when buoyancy forces occur.

According to a first embodiment, to this end, prior to the restoration of the old shaft construction 100 a groove is chiseled or milled partially or circumferentially in the inner wall thereof as long as such grooves are not already present between the concrete rings of the shaft construction 100. Since the material of the lining tube 1 can expand very easily and as a result of the internal pressure is pressed during the expansion prior to the curing against the inner wall of the old shaft construction 100, the laminate is placed in the prepared and/or provided groove so that after the curing a concave positive-locking connection is produced. In this instance, the grooves which are introduced in the inner wall of the old shaft construction 100 form retention elements 140 which produce a concave bulge 302 of the layer of fiber material 20 which brings about the mechanical positive-locking connection.

It is also conceivable prior to the restoration of the old shaft construction 100 to prepare partially or circumferentially a convex positive-locking connection by retention means 141 which are directed from the inner wall of the old shaft construction 100 in a radially inward direction and which after the curing of the fiber material of the layer 20 lead to a convex bulge 303 therein, as indicated by the lower retention element 141 in FIG. 6.

To this end, either corresponding preformed components are adhesively bonded or screwed onto the old sewer channel wall, or there are nailed between the individual concrete rings of the old shaft construction 100 correspondingly formed nails with large heads which are directed inwardly from the inner wall of the old shaft construction 100 toward the center. It is also conceivable to configure the retention elements 141 as a circumferential or partial bead which is formed by means of mortar or synthetic resin on the inner wall of the old shaft construction 100 and is cured prior to the assembly of the lining tube 1. It is also conceivable for the remainders of old rungs which always otherwise have to be removed before the restoration to remain in the sewer shaft 100 and to protrude into the shaft. With all these embodiments described above, the particularly expandable fiber material of the layer 20 of the lining tube 1 is placed prior to the curing of the reaction resin over these convex retention elements 141 and forms convex bulges 303 which produce the positive-locking connection between the fiber material and the old shaft construction 100.

At the same time or alternatively, a bonding 301 which is indicated in FIG. 6 and which is introduced in the lower region of the cylindrical portion 120 can be provided in order to discharge the buoyancy forces of the cured, outwardly sealed lining tube 1 alone or optionally in addition to other measures. To this end, a suitable adhesive, preferably epoxy resin or polyurethane adhesive, is applied to the inner wall of the lower second shaft portion 120 before the lining tube 1 is lowered into the sewer shaft 100. Depending on the adhesive, where applicable to this end the outer film of the outer film tube 40 and if present also the additional outer film tube 50 have to be removed. As a result of the expansion of the lining tube 1 by means of the compressed air, the adhesive is advantageously distributed to form a relatively thin layer and as a result of the pressure which is applied is also pressed even into smallest rough portions of the old shaft construction 100. Consequently, as a result of the adhesive, not only an adhesive connection, but also a positive-locking connection is obtained via the roughness of the inner wall of the old sewer shaft 100

LIST OF REFERENCE NUMERALS

1 Lining tube
6 Pressure gas source
10 Inner film tube
10a First circumferential portion of the inner film tube
10b Second circumferential portion of the inner film tube
12 Connection portion
13 Film loop
14 Desired breaking location
16 Flat film formed into a tube
16a Edge portion
16b Edge portion
17a Longitudinal edge
17b Longitudinal edge
18 Welded-on film strip
20 Radially expandable tubular layer of fiber material
22 Fiber strip
30 Longitudinal draw string
40 Outer film tube
41 Lateral weld seam of the outer film tube
42a First longitudinal slot in the outer film tube
42b Second longitudinal slot in the outer film tube
50 Additional outer film tube made of reinforced tension-resistant material
60 Additional inner film tube
62 Sealing element/cord
64 Air bag
70 First lower end of the layer of fiber material
72 Seam
80 Lubricant
100 Sewer shaft
110 First shaft portion
115 Conical portion
120 Second shaft portion
130 Berm
131 Channel
140 Concave retention elements
141 Convex retention elements
150 Restored shaft construction
160 Ground water level
200 Packer
301 Bonding
302 Concave bulge of the layer of fiber material
303 Convex bulge of the layer of fiber material
L Longitudinal axis of the lining tube

The invention claimed is:

1. A lining tube for restoring a defective sewer shaft, wherein the sewer shaft has a first shaft portion with a first diameter and an adjacent second shaft portion with an expanded diameter and a berm and a channel, the lining tube comprising:
 an inner film tube;
 a tubular layer of fiber material arranged around said inner film tube and configured to be radially expanded, said fiber material being impregnated with a curable reaction resin;
 said inner film tube having a connection portion which extends in a longitudinal direction thereof, and which connects two circumferential portions, of said inner film tube that extend parallel with each other, to form a circumferentially closed inner film tube having a defined nominal diameter;
 said connection portion having a desired breaking location which extends along the inner film tube and which is configured to be separated by introducing a pressurized medium into said inner film tube in a circumferential direction in order to radially expand said inner film tube and said layer of fiber material over the nominal diameter;

said radially expandable tubular layer of fiber material being closed at a first end which can be introduced into the channel of the sewer shaft by a seam that extends orthogonally with respect to the longitudinal axis of the tubular layer of fiber material.

2. The lining tube according to claim 1, which further comprises an outer film tube disposed around said layer of fiber material, said outer film tube having a first longitudinal slot which rises at a first end of said seam and a second longitudinal slot which rises at a second end of said seam.

3. The lining tube according to claim 2, wherein said first and second longitudinal slots extend parallel to the longitudinal center axis of said tubular layer of fiber material.

4. The lining tube according to claim 2, wherein each of said first longitudinal slot and said second longitudinal slot has a length which substantially corresponds to a width of the berm plus one half of an inner wall face of the channel.

5. The lining tube according to claim 2, wherein between an inner side of said outer film tube and an outer portion, which is defined between said first and second longitudinal slots, of said tubular layer of fiber material, a lubricant, is applied in order to reduce friction between an inner side of said outer film tube and an outer side of said tubular layer of fiber material in order to prevent folds in transition regions between the inner wall of the sewer shaft and the berm and/or the berm and the channel during expansion of the lining tube when compressed air is being introduced.

6. The lining tube according to claim 5, wherein the lubricant is silicone oil.

7. The lining tube according to claim 1, wherein said tubular, radially expandable layer of fiber material comprises at least one fiber tape which is wound with a helical overlap or at least one fiber tape which extends in the longitudinal direction of said lining tube and which is placed in an overlapping manner at longitudinal edges thereof and said fiber material of which has an expandability of more than 10% so that said tubular layer of fiber material, when the pressurized medium is introduced into the interior of said lining tube, can radially increase from a first diameter to a second diameter that exceeds the first diameter by at least 10%.

8. The lining tube according to claim 7, wherein the second diameter is greater than the first diameter by more than 30%.

9. The lining tube according to claim 1, which further comprises an additional inner film tube disposed within said inner film tube, said additional inner film tube being made of an air-tight transparent plastics material and extending in the longitudinal direction of said lining tube over an entire length thereof and having one end to be closed in an air-tight manner by way of a sealing element.

10. The lining tube according to claim 1, wherein said sealing element is a knot or a cord wound around an outer side of said additional inner film tube or a cable tie closing said additional inner film tube to form an air bag which is closed at one side and which is arranged within said tubular layer of fiber material that is closed by said seam at the end side and which can be radially expanded.

11. A method for lining a defective sewer shaft, which has a first shaft portion with a first diameter and an adjacent second shaft portion with an expanded diameter, and a berm and a channel below the second shaft portion, the method comprising:
providing a lining tube according to claim 1 and securing one end of the lining tube to a pot-shaped packer;
lifting the packer with the lining tube secured thereto into a vertical position above the sewer shaft such that the seam is located at the lower end of the lining tube, orientating the seam along the channel of the sewer shaft, orientating the end of the lining tube that is closed by the seam until the seam extends parallel to the longitudinal direction of the channel and lowering the packer with the lining tube secured thereto into the sewer shaft until the seam comes to rest in the channel;
expanding an air bag which is closed in an air-tight manner in the region of the base of the sewer shaft inside the lining tube by introducing a pressurized medium into the air bag to radially expand the lining tube inside the sewer shaft with the desired breaking location being separated in the connection portion and the lining tube bearing on the inner wall of the expanded second sewer portion and on the berm and the channel; and
curing the reaction resin in the layer of fiber material by introducing a radiation source or hot vapor or hot water into the interior of the expanded air bag arranged in the lining tube.

12. The method according to claim 11, wherein the pressurized medium is compressed air.

13. The method according to claim 11, which comprises introducing the first and second longitudinal slots into the outer film tube when the outer film tube is located in a vertical position above the sewer shaft after the packer has been raised.

14. The method according to claim 13, which comprises, after the first and second longitudinal slots have been introduced into the outer film tube, folding over the slotted portions of the outer film tube in an upward direction, subsequently applying a lubricant to the uncovered regions of the outer side of the layer of fiber material, and subsequently folding the slotted portions of the outer film tube back again onto the outer side, which is provided with lubricant, of the radially expandable layer of fiber material.

15. The method according to claim 11, which comprises, prior to lowering the lining tube into the sewer shaft, providing retention elements on the inner wall of the first and/or second shaft portion retention elements which, after the lining tube has been completely lowered into the sewer shaft, are covered by the outer side of the outer film tube and the fiber material which is arranged therein with a local radial bulge of the fiber material being produced, wherein the local radial bulges of the fiber material engage behind the retention elements after the expansion and curing of the lining tube in a positive-locking manner and mechanically fix the lining tube in the sewer shaft.

16. The method according to claim 15, wherein the retention elements are blocks and/or shortened rungs and/or grooves.

17. A method for producing a lining tube, the method comprising:
shaping a transparent plastics material flat film to form a circumferentially closed inner film tube having a predetermined nominal diameter by overlapping adhesive bonding or welding of longitudinal edges of the transparent plastics material flat film and/or by adhesive bonding or thermally welding a transparent film strip on two adjacent, mutually parallel outer circumferential portions of the plastics material flat film which is arranged in a tubular manner with a connection portion that has a desired breaking location which extends in a longitudinal direction of the inner film tube being produced;
arranging a radially expandable tubular layer of fiber material on an outer side of the circumferentially closed tubular inner film tube by overlapping helical winding or overlapping placement of at least one resin-impregnated fiber tape around the inner film tube; and closing a first lower end of the layer of fiber material by a seam, which extends orthogonally to the longitudinal axis of the tubular, radially expandable layer of fiber material.

18. The method according to claim 17, wherein the resin-impregnated fiber tape is a glass fiber tape.

19. The method according to claim 17, which further comprises:

arranging an outer film tube around the tubular, radially expandable layer of fiber material and forming a first longitudinal slot which rises at a first end of the seam and a second longitudinal slot which rises at a second end of the seam into the outer film tube.

20. The method according to claim 19, which comprises forming the first and second longitudinal slots to extend parallel with a longitudinal center axis of the tubular, radially expandable layer of fiber material.

21. The method according to claim 17, which further comprises introducing lubricant between the inner side of the outer film tube and an outer portion, which is defined between the first and the second longitudinal slot, of the tubular layer of fiber material.

\* \* \* \* \*